July 2, 1940.  B. H. CARROLL  2,206,076

PHOTOGRAPHIC EMULSION

Filed April 22, 1939

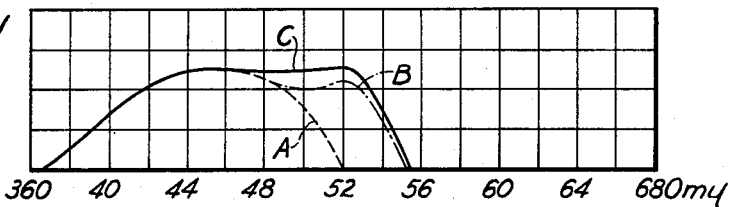

Fig. 1

A = 2,4'-diethylthia-2',4'-thiazinocyanine iodide.
B = 2-methyl-1'-ethylthia-2'-cyanine iodide.
C = mixture of these two dyes.

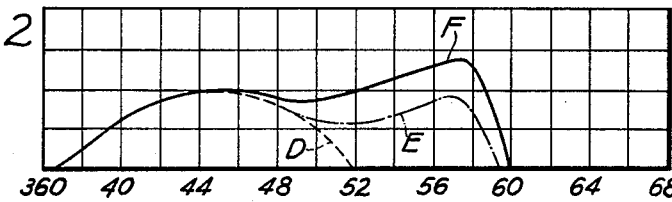

Fig. 2

D = 2,4'-diethylselena-2',4'-thiazinocyanine iodide.
E = 1,1'-diethyl-2,2'-cyanine iodide.
F = mixture of these two dyes.

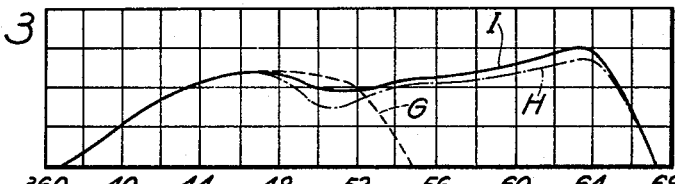

Fig. 3

G = 4,1'-diethyl-2,4-thiazino-2'-cyanine iodide.
H = 4,4'-dichloro-2,2',8-triethylthiacarbocyanine iodide.
I = mixture of these two dyes.

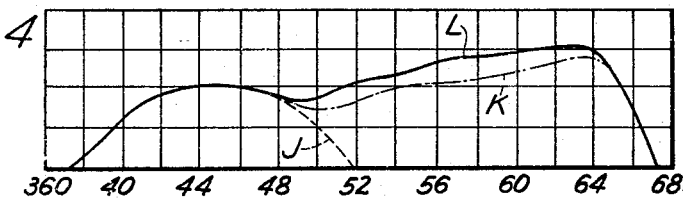

Fig. 4

J = 2,4'-diethyl-3,4-benzoxa-2',4'-thiazino-
    cyanine iodide.
K = 4,4'-dichloro-2,2',8-triethylthiacarbocyanine iodide.
L = mixture of these two dyes.

BURT H. CARROLL
INVENTOR

BY  N. M. Perrins
    Daniel J. Mayne
    ATTORNEYS

Patented July 2, 1940

2,206,076

UNITED STATES PATENT OFFICE 2,206,076

PHOTOGRAPHIC EMULSION

Burt H. Carroll, Rochester, N. Y., assignor to Eastman Kodak Company, Rochester, N. Y., a corporation of New Jersey Application April 22, 1939, Serial No. 269,372

18 Claims. (Cl. 95—7)

This invention relates to sensitized photographic emulsions and more particularly to photographic emulsions, such as those of the gelatino-silver-halide type, containing a mixture or combination of two or more sensitizing materials, at least one of which cooperates with at least one other to alter the sensitivity of the emulsion to a greater degree than is possible with any one of the sensitizing materials alone. The sensitization produced by the combination is always greater, in some spectral region, than the total of the sensitizations produced by the separate sensitizing materials. The sensitizing materials of my combinations are substances generally referred to as dyes.

It is known in the art of making photographic emulsions that certain dyes of the cyanine class alter the sensitivity of photographic emulsions of the gelatino-silver-halide type when incorporated in the emulsions. The sensitizing effect produced by the dye does not increase proportionally to the amount of the dye, but passes through a maximum as the concentration is increased. Within the range of concentrations most useful in practice, the sensitivity increases much more slowly than the concentration of the dye. The combined effect of two or more dyes is rarely equivalent to the sum of their separate effects; in general it is much less. Most commonly, the combined effect is no greater than the effect of a single one of the dyes employed in a concentration equal to the sum of the concentrations of all the dyes in the combination.

I have found with certain combinations of two or more dyes that the combined sensitization is substantially greater, in same spectral region, than that of any one of the dyes in the absence of the other or others. I call this phenomenon supersensitization. In general, at least one dye of my combination may be said to be supersensitized by the other or others. The dye which is supersensitized by the other or others may be called the basic sensitizer and the other dye the supersensitizer. However, the effect may be mutual and the dyes indistinguishable from the standpoint of which is supersensitized.

Supersensitization is a highly specific phenomenon and is found only in mixtures or combinations from certain specific groups. Supersensitization can be most readily observed when a dye is supersensitized in a spectral region for which the other dye does not sensitize, as is the case in the supersensitizing combinations of the instant application. The magnitude of supersensitization depends upon the relative and absolute concentrations of the dyes in the emulsion and on the type of emulsion.

My instant application deals with emulsions containing supersensitizing mixtures or combinations of one or more sensitizing 8-alkyl carbocyanine dyes and/or one or more sensitizing pseudo-cyanine dyes which do not contain a benzothiazine nucleus together with one or more sensitizing thiazinocyanine dyes. Just how the dyes of my mixtures cooperate to give a supersensitizing effect is now known. I shall refer to my mixtures as combinations, although I do not intend to imply that the dyes are chemically combined. My instant combinations are of added interest since they constitute the first known instance where a pseudocyanine is supersensitized by another pseudocyanine or other simple cyanine.

An object of my invention, therefore, is to provide photographic emulsions containing a supersensitizing combination of dyes. A further object is to provide a process for sensitizing photographic emulsions with supersensitizing combinations of dyes and to provide a method of increasing the sensitivity of photographic emulsions sensitized with cyanine dyes. A still further object is to provide a photographic element comprising a support coated with such supersensitized emulsions. Other more specific objects will become apparent hereinafter.

The dyes which I employ in my supersensitizing combinations are sensitizers of photograhic emulsions when used alone. While there is more than one manner of formulating and naming the dyes which I employ in practicing my invention, it is believed that the formulas, systems of numbering and names used herein are in accordance with those used during the development of the cyanine dye art to its present stage. The most probable formulas of representative dye-types are given below in order to set forth clearly the nature of the materials employed in my supersensitizing mixtures. These formulas should not be construed as limiting my invention except as indicated in the appended claims.

The thiazinocyanine dyes which I employ in practicing my invention can be represented by either of the following general formulas:

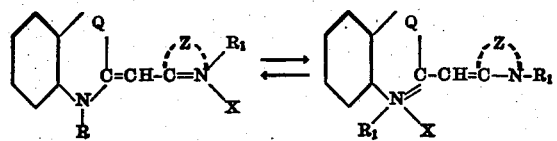

(As illustrated, the two forms are interconvertible and the dyes can be represented by either formula.) In the above formulas R and R' represent alkyl groups, such as methyl, ethyl, isobutyl, allyl or β-hydroxyethyl, for example, Q represents a -CH₂-S- group, X represents an acid radical, such as iodide, p-toluene-sulfonate or perchlorate for example, and Z represents the non-metallic atoms necessary to complete a five-membered or six-membered heterocyclic nucleus.

Among the simple thiazinocyanines useful in practicing my invention are the following:

The thia-2',4'-thiazinocyanines which have the following general formula:

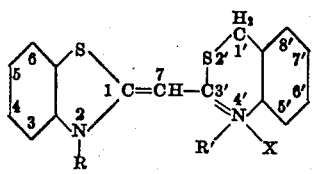

The 2,4-thiazino-2'-cyanines which have the following general formula:

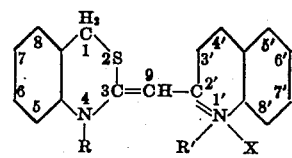

The selena-2',4'-thiazinocyanines which have the following general formula:

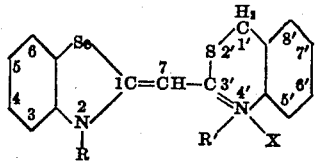

The 2,4-thiazinothiazolino cyanines which have the following general formula:

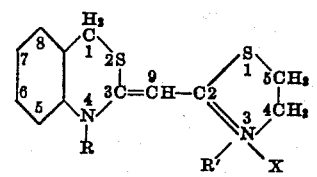

The 5,6-benzothia-2',4'-thiazinocyanines which have the following general formula:

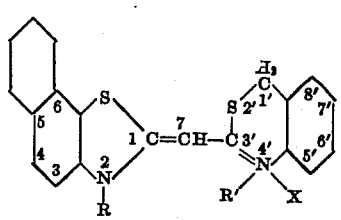

The 3,4-benzoxa-2',4'-thiazinocyanines which have the following general formula:

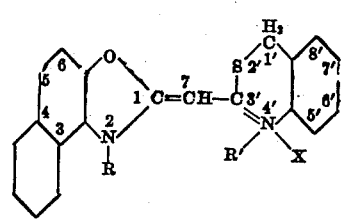

The thia-1',4'-thiazinocyanines which have the following general formula:

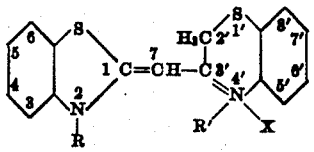

In the above formulas, R and R' represent alkyl groups and X represents an acid radical. I have found it convenient to employ the thiazinocyanine dye-iodides (where X represents iodine) in practicing my invention. However, other dye-salts, such as the chlorides, bromides, perchlorates, alkylsulfates, or p-toluenesulfonates can be employed for example. I have found it advantageous to employ dyes wherein R and R' represent alkyl groups of the formula $C_nH_{2n+1}$ wherein $n$ represents a positive integer of from one to four. The dyes wherein R and R' represent ethyl groups are especially advantageously employed. The nuclei of the dyes can carry simple substituents which do not interfere with sensitizing properties, such as, for example, alkyl, chloro, alkoxy or dialkylamino groups.

The thiazinocyanine dyes can be prepared as described in British Patent 478,945, complete accepted January 24, 1938.

Among the pseudocyanines which can be employed in practicing my invention are the following:

The 2,2'-cyanines which can be represented by the following general formula:

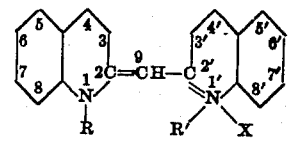

The 5,6-benz-2,2'-cyanines which can be represented by the following general formula:

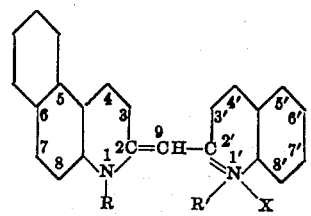

The thia-2'-cyanines which can be represented by the following general formula:

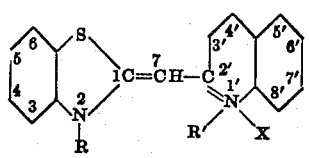

The 3,4-benzothia-2'-cyanines which can be represented by the following general formula:

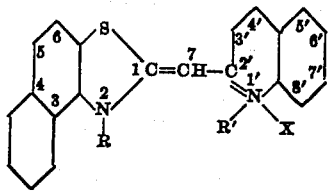

The 3,4-benzoxa-2'-cyanines which can be represented by the following general formula:

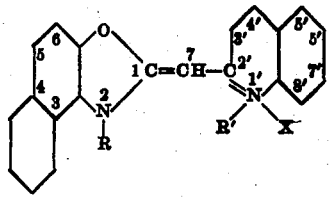

The selena-2'-cyanines which can be represented by the following general formula:

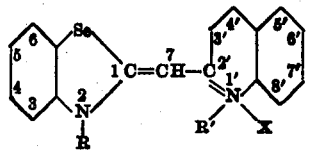

The thiazolo-2'-cyanines which can be represented by the following general formula:

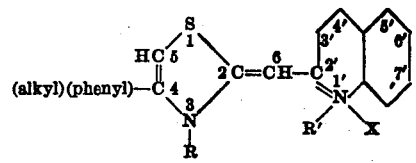

The oxazolo-2'-cyanines which can be represented by the following general formula:

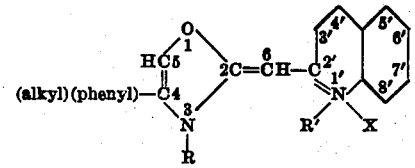

In the above general formulas R and R' represent alkyl groups and X represents an acid radical. In practicing my invention, I have found it convenient to employ pseudocyanine iodides (wherein X represents iodine). However, other pseudocyanine-salts can be employed, such as for example, chlorides, bromides, perchlorates, alkylsulfates or p-toluenesulfonates. I have further found it advantageous to employ dyes wherein R and R' represent an alkyl group of the formula $C_nH_{2n+1}$ wherein $n$ represents a positive integer of from one to four. Pseudocyanine dyes wherein R and R' represent ethyl groups are especially advantageously employed. The pseudocyanine dyes can be substituted in their nuclei with simple substituents which do not interfere with sensitizing properties, such as, for example, alkyl, chloro, alkoxy or dialkylamino groups.

Brooker and Keyes, in the Journal of the American Chemical Society, vol. 57, pages 2488–2491 (1935) have reviewed the literature pertaining to pseudocyanine dyes and describe methods for the preparation thereof. Thiazolo- and oxazolopseudocyanine dyes are described in United States Patent 2,143,839, dated January 17, 1939.

The 8-alkylcarbocyanine dyes which I employ in practicing my invention can be represented by the following general formula:

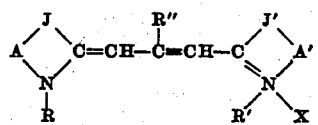

wherein A and A' represent phenylene or naphthylene groups, J and J' represent oxygen, sulfur or selenium, R, R' and R'' represent alkyl groups, such as methyl, ethyl, butyl, allyl or β-hydroxyethyl for example, and X represents an acid radical.

Among the 8-alkyl carbocyanines useful in practicing my invention are the following:

The 8-alkylthiacarbocyanines which can be represented by the following general formula:

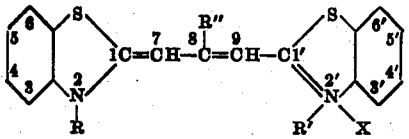

The 8-alkyl-3,4,3',4'-dibenzothiacarbocyanines which can be represented by the following general formula:

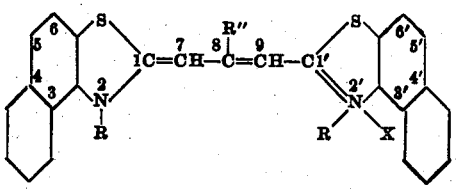

The 8-alkyl-benzothiacarbocyanines which can be represented by the following general formula:

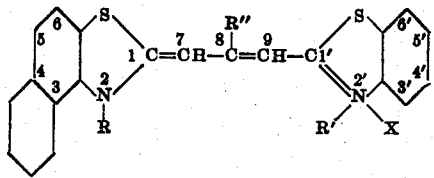

The 8-alkylthiaselenacarbocyanines which can be represented by the following general formula:

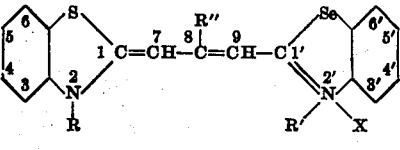

The 8-alkylselenacarbocyanines which can be represented by the following general formula:

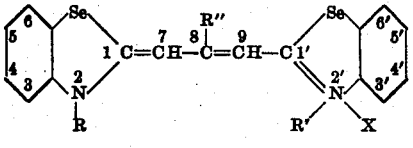

The 8-alkyl-5,6,5',6'-dibenzoxacarbocyanines which can be represented by the following general formula:

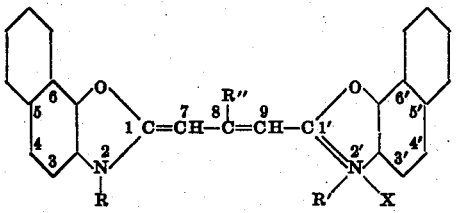

In all of the above formulas, R, R' and R'' represent alkyl groups and X represents an acid radical. I have found it convenient to employ the carbocyanine dye-iodides (where X represents iodide) in practicing my invention. However, other dye-salts, such as the chlorides, bromides, perchlorates, alkylsulfates or p-toluenesulfonates can be employed, for example, I have also found it advantageous to employ the dyes wherein R" represents methyl or ethyl and R and R' represent an alkyl group of the formula $C_nH_{2n+1}$ wherein $n$ represents a positive integer of from one to four. Dyes wherein R and R' are ethyl groups are especially advantageously employed. The nuclei of the dyes can carry simple substituents which do not interfere with sensitizing properties, such, for example, as alkyl, alkoxy, chloro or amino groups.

Symmetrical 8-alkylthiacarbocyanines are described in United States Patent 1,934,657, dated November 7, 1933. Symmetrical 8-alkylselenacarbocyanines are described in United States Patent 1,990,681, dated February 12, 1935. Symmetrical 8-alkyldibenzothiacarbocyanines are described in United States Patent 1,969,444, dated August 7, 1934. Unsymmetrical 8-alkylcarbocyanine dyes of the kind I employ in practicing my invention can be prepared as described in United States Patent 2,112,140, dated March 22, 1938.

According to my invention, I incorporate one or more sensitizing simple thiazinocyanine dyes together with one or more sensitizing pseudocyanine and/or one or more sensitizing 8-alkylcarbocyanines in a photographic emulsion. My invention is particularly directed to the ordinarily employed gelatino-silver-halide emulsions. However, my supersensitizing combinations can be employed in emulsions in which the carrier is other than gelatin, for example, a resinous substance or cellulosic derivative which has substantially no deleterious effect on the light-sensitive materials. As silver halide emulsions, I include such emulsions as are commonly employed in the art, but more particularly the customarily employed silver chloride and silver bromide emulsions. The silver chloride and silver bromide emulsions may contain other salts which may be light-sensitive. By way of illustration, the herein described supersensitized emulsions were prepared employing an ordinary gelatino-silver-bromide emulsion of ordinary concentration (approximately 40 grams of silver halide per liter).

The sensitizing dyes can be employed in various concentrations depending upon the effects desired. As is well known in the art, the sensitivity conferred upon an emulsion by a sensitizing dye does not increase proportionately to the concentration of the dye in the emulsion, but rather passes through a maximum as the concentration is increased. In practicing my invention, the individual sensitizing dyes are advantageously employed in a concentration somewhat less than their optimum concentration (i. e. the concentration at which the individual dyes give greatest sensitivity). If each of the dyes in the supersensitizing combination is employed in its optimum concentration, it is possible, in certain instances, that the sensitization produced by the supersensitizing combination will have passed through a maximum.

The optimum concentration of an individual sensitizing dye can be determined in a manner well known to those skilled in the art by measuring the sensitivity of a series of emulsions containing different concentrations of the sensitizing dye. The optimum concentration of my supersensitizing combinations can, of course, be readily determined in the same manner by measuring the sensitivity of a series of emulsions containing different concentrations of the individual dyes in the combination. As stated above, in determining the optimum concentration for the supersensitizing combination, it is advantageous to employ at first concentrations of the individual dyes somewhat less than their optimum concentrations. The concentrations of the individual dyes can then be increased until the optimum of the supersensitizing combination is determined.

Ordinarily, the optimum or near optimum concentrations of a sensitizing dye is of the order of 5 to 20 mg. of the dye per liter of emulsion. In preparing my supersensitizing combinations, I have found that the concentrations of the individual dyes are ordinarily advantageously within the range, 5 to 20 mg. of the dye per liter of emulsion. However, the ratio of concentration of thiazinocyanine to pseudocyanine or 8-alkylcarbocyanine can vary widely, from 5:1 to 1:5 for example, in many cases.

The methods of incorporating dyes in emulsions are simple and well known to those skilled in the art. In practicing my invention, the dyes of my combinations can be added to the emulsions separately or together. It is convenient to add the dyes separately in the form of their solutions in appropriate solvents. The solvent must, of course, be compatible with the emulsion, substantially free from any deleterious effect on the light-sensitive materials in the emulsions. Methanol has proven satisfactory as a solvent for the dyes in practicing my invention. Methanol solutions (diluted somewhat with water, if desired) were added slowly to the flowable emulsions with stirring. Stirring or some form of agitation should be continued until the dyes are uniformly distributed throughout the emulsion. The dyes are advantageously incorporated in the finished, washed emulsions. The emulsions can then be converted into photographic elements by coating the emulsions upon a support, such as glass, cellulose acetate, cellulose nitrate or other cellulose derivative or resin, in a manner well known to those skilled in the art.

The following combinations are illustrative of my invention. These illustrations are not intended to limit my invention.

A. 2,4'-diethylthia-2',4-thiazinocyanine iodide with one or more of the following pseudocyanines:

1,1'-diethyl-2,2'-cyanine iodide
1,1'-diethyl-6-methyl-2,2'-cyanine iodide
1-methyl-1'-ethyl-2,2'-cyanine iodide
1,1'-diethyl-5,6-benzo-2,2'-cyanine iodide
2-methyl-1'-ethylthia-2'-cyanine iodide
4-chloro-2,1'-diethylthia-2'-cyanine iodide
2,1'-diethyl-3,4-benzothia-2'-cyanine iodide
2,1'-diethyl-6'-methyl-3,4-benzothia-2'-cyanine iodide
2,1'-diethyl-3,4-benzoxa-2'-cyanine iodide
2,1'-diethylselena-2'-cyanine iodide
3,1'-diethyl-4-phenylthiazolo-2'-cyanine iodide B. 4,4'-dichloro-2,2',8-triethylthia-carbocyanine iodide with one or more of the following thiazinocyanines:

2,4'-diethylthia-2',4'-thiazinocyanine iodide
4,1'-diethyl-2,4-thiazino-2'-cyanine iodide
2,4'-diethyl-5,6-benzothia-2',4'-thiazinocyanine iodide
2,4'-diethylselena-2',4'-thiazinocyanine iodide
4,3'-diethyl-2,4-thiazino-thiazolinocyanine iodide
2,4'-diethyl-3,4-benzoxa-2',4'-thiazinocyanine iodide C. 2,2',8-triethyl-5,6,5',6'-dibenzoxacarbocyanine iodide with one or more of the following thiazinocyanines:

2,4'-diethylthia-2',4'-thiazinocyanine iodide
4,1'-diethyl-2,4-thiazino-2'-cyanine iodide
2,4'-diethyl-5,6 - benzothia-2',4'-thiazinocyanine iodide
2,4'-diethylselena-2',4'-thiazinocyanine iodide
4,3'-diethyl-2,4-thiazinothiazolinocyanine iodide
2,4'-diethyl-3,4-benzoxa-2',4'-thiazinocyanine iodide D. 2,2'-diethyl-3,4,3',4'-dibenzo -8 - methylthiacarbocyanine iodide with one or more of the following thiazinocyanines:

4,1'-diethyl-2,4-thiazino-2'-cyanine iodide 2,4'-diethyl-3,4 - benzoxa - 2',4' - thiazinocyanine iodide E. 5,5'-dichloro-2,2',8-triethylthia - carbocyanine iodide with 4,1'-diethyl-2,4-thiazino-2'-cyanine iodide.

Thia-2',4'-thiazinocyanines, particularly 2,4'-diethylthia-2',4'-thiazinocyanine iodide, are especially useful thiazinocyanines to employ in my supersensitizing combinations. With the pseudocyanines given under (A) above particularly useful supersensitizing effects are obtained. Also, particularly useful effects are obtained using 4,4'-dichloro-8-alkylthiacarbocyanines and 8-alkyl-5,6,5',6'-dibenzoxacarbocyanines with the thiazinocyanines set forth under (B) and (C) above.

The accompanying drawing depicts the supersensitizing effect obtained with four of my new combinations. Each figure of the drawing is a diagrammatic reproduction of three spectrograms, showing first the sensitivity of an ordinary gelatino-silver-bromide emulsion containing a thiazinocyanine dye (represented by the dotted line in each figure), second, the sensitivity of the same gelatino-silver-bromid emulsion containing a pseudocyanine or 8-alkylcarbocyanine dye (represented by the dot and dash line in each figure) and third, the sensitivity of the same gelatino-silver-bromide emulsion containing a mixture or combination of the said thiazinocyanine dye with the said pseudocyanine or 8-alkylcarbocyanine dye (represented by the solid line in each figure). The supersensitizing effect is apparent from the drawing.

More specifically in Fig. 1, curve A represents the sensitivity of an ordinary gelatino-silver-bromide emulsion containing 2,4'-diethylthia-2',4'-thiazinocyanine iodide in a concentration of 20 mg. per liter of emulsion. The sensitivity is about the same as that of the ordinary gelatino-silver-bromide emulsion without the thiazinocyanine. Curve B represents the sensitivity of the same gelatino-silver-bromide-emulsion containing 2-methyl-1'-ethylthia-2'-cyanine iodide in a concentration of 20 mg. per liter of emulsion. Curve C represents the sensitivity of the same gelatino-silver-bromide emulsion containing 2,4'-diethylthia-2',4'-thiazinocyanine iodide (20 mg. per liter) and 2-methyl-1'-ethylthia-2'-cyanine iodide (20 mg. per liter). The green sensitivity of the emulsion represented by curve C, is about 50% greater than that of the emulsion represented by curve B.

In Fig. 2, curve D represents the sensitivity of an ordinary gelatino-silver-bromide emulsion containing 2,4'-diethyl-selena-2',4'-thiazinocyanine iodide in a cencentration of about 4 mg. per liter of emulsion. The sensitivity is about the same as that of the ordinary gelatino-silver-bromide emulsion without the thiazinocyanine. Curve E represents the sensitivity of the same gelatino-silver-bromide emulsion containing 1,1'-diethyl-2,2'-cyanine iodide in a concentration of 20 mg. per liter of emulsion. Curve F represents the sensitivity of the same gelatino-silver-bromide emulsion containing 2,4'-diethylselena-2,4'-thiazinocyanine iodide (4 mg. per liter) and 1,1'-diethyl-2,2'-cyanine iodide (20 mg. per liter). The green sensitivity of the emulsion represented by curve F, is about 300% greater than that of the emulsion represented by curve E.

In Fig. 3, curve G represents the sensitivity of an ordinary gelatino-silver-bromide emulsion containing 4,1'-diethyl-2,4-thiazinocyanine-2'-cyanine iodide in a concentration of 10 mg. per liter of emulsion. In this case the thiazinocyanine extends the sensitivity of the ordinary gelatino-silver-bromide emulsion somewhat. Curve H represents the sensitivity of the same gelatino-silver-bromide emulsion containing 4,4'-dichloro-2,2',8-triethyl-thiacarbocyanine iodide in a concentration of about 10 mg. per liter of emulsion. Curve I represents the sensitivity of the same ordinary gelatino-silver-bromide emulsion containing 4,1'-diethyl-2,4-thiazinocyanine-2'-cyanine iodide (10 mg. per liter) and 4,4'-dichloro-2,2',-8-triethylthiacarbocyanine iodide (10 mg. per liter). The red sensitivity of the emulsion represented by curve I is about 50% greater than that of the emulsion represented by curve H.

In Fig. 4, curve J represents the sensitivity of an ordinary gelatino-silver-bromide emulsion containing 2,4'-diethyl-3,4-benzoxa-2',4'-thiazinocyanine iodide in a concentration of 10 mg. per liter of emulsion. The sensitivity is about the same as that of the ordinary gelatino-silver-bromide emulsion without the thiazinocyanine. Curve K represents the sensitivity of the same ordinary gelatino-silver-halide emulsion containing 4,4'-dichloro-2,2',8-triethylthiacarbocyanine iodide in a concentration of about 20 mg. per liter of emulsion. Curve L represents the sensitivity of the same ordinary gelatino-silver-bromide emulsion containing 2,4'-diethyl-3,4-benzoxa-2',4'-thiazinocyanine iodide (10 mg. per liter) and 4,4'-dichloro-2,2',8-triethylthiacarbocyanine iodide (20 mg. per liter). The red sensitivity of the emulsion represented by curve L, is about 50% greater than that of the emulsion represented by curve K.

The spectrograms which are diagrammatically represented in the drawing were made in a wedge spectrograph. Each horizontal line represents an incident light intensity of about one-tenth that of the line below it. In each comparison of three spectrograms, the plates from which the spectrograms were made were coated from the same batch of emulsion, dried and processed together.

Similarly, an ordinary gelatino-silver-bromide emulsion sensitized with 2,1'-diethyl-3,4-benzothia-2'-cyanine iodide, in a concentration of 20 mg. per liter of emulsion, was increased in green sensitivity of about 100% when 2,4'-diethylthia-2',4'-thiazinocyanine iodide (in a concentration of 20 mg. per liter of emulsion) was incorporated in the sensitized emulsion, yet the thiazino dye, in itself, had little or no effect on the gelatino-silver-bromide emulsion. An ordinary gelatino-silver-bromide emulsion sensitized with 4,4' - dichloro - 2,2',8 - triethylthiacarbocyanine chloride, in a concentration of 20 mg. per liter of emulsion, was increased in red sensitivity by about 50% when 2,4'-diethylthia-2',4'-thiazinocyanine iodide (20 mg. per liter of emulsion) was incorporated in the sensitized emulsion, yet the thiazino dye, in itself, had little or no effect on the gelatino-silver-bromide emulsion. An ordinary gelatino-silver-bromide emulsion sensitized with 2,2',8-triethyl-5,6,5',6'-dibenzoxacarbocyanine iodide, in a concentration of 10 mg. per liter of emulsion, was increased in green sensitivity by about 50% when 4,1'-diethyl-2,4-thiazino-2'-cyanine iodide (6 mg. per liter of emulsion) was incorporated in the sensitized emulsion, yet the thiazino dye, in itself, has but a small sensitizing effect on the gelatino-silver-bromide emulsion.

An ordinary gelatino-silver-bromide emulsion sensitized with 1,1'-diethyl-2,2'-cyanine iodide, in a concentration of 15 mg. per liter of emulsion, showed an increase in green sensitivity of about 400% when 2,4'-dimethylthia-1',4'-thiazinocyanine iodide (10 mg. per liter of emulsion) was incorporated in the sensitized emulsion, yet the thiazino dye has, in itself, a very small effect on the gelatino-silver-bromide emulsion.

An ordinary gelatino-silver-bromide emulsion sensitized with 1-methyl-1'-ethyl-2,2'-cyanine iodide, in a concentration of 15 mg. per liter of emulsion, showed an increase in green sensitivity of about 300% when 2,4'-dimethylthia-1',4'-thiazinocyanine iodide (5 mg. per liter of emulsion) was incorporated in the sensitized emulsion.

An ordinary gelatino-silver-bromide emulsion sensitized with 6'-methyl-2,1'-diethyl-3,4-benzothia-2'-cyanine iodide, in a concentration of 10 mg. per liter of emulsion, showed an increase in green sensitivity of about 40% when 2,4'-dimethylthia-1',4'-thiazinocyanine iodide (5 mg. per liter of emulsion) was incorporated in the emulsion.

An ordinary gelatino-silver-halide emulsion sensitized with 4,4'-dichloro-2,2',8-triethylthiacarbocyanine chloride, in a concentration of 10 mg. per liter of emulsion, showed an increase in red sensitivity of about 40%, when 2,4'-dimethylthia-1',4'-thiazinocyanine iodide (10 mg. per liter of emulsion) was incorporated in the sensitized emulsion.

Still further illustrations of the supersensitizing effects attained according to my invention could be given, but the foregoing are believed to demonstrate the manner of practicing the invention.

What I claim as my invention and desire to be secured by Letters Patent of the United States is:

1. A photographic silver halide emulsion containing a supersensitizing combination of at least one sensitizing thiazinocyanine of the following general formula:

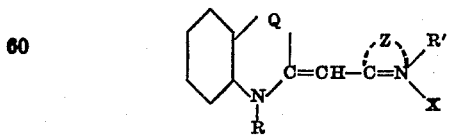

wherein R and R' represent alkyl groups, X represents an acid radical, Q represents a

—CH₂—S— group and Z represents the non-metallic atoms necessary to complete a heterocyclic nucleus selected from the group consisting of five-membered and six-membered heterocyclic nuclei, together with at least one sensitizing dye selected from the group consisting of sensitizing pseudocyanine dyes which do not contain a benzothiazine nucleus and sensitizing 8-alkylcarbocyanine dyes having the following general formula:

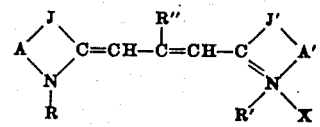

wherein A and A' represent a divalent organic group selected from the group consisting of phenylene and naphthylene groups, J and J' represent a divalent atom selected from the group consisting of oxygen, sulfur and selenium, R, R' and R'' represent alkyl groups and X represents an acid radical.

2. A photographic gelatino-silver-halide emulsion containing a supersensitizing combination of at least one sensitizing thiazinocyanine of the following general formula:

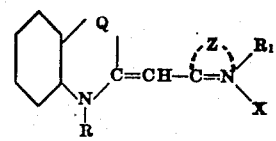

wherein R and R' represent alkyl groups, X represents an acid radical, Q represents a

—CH₂—S— group and Z represents the non-metallic atoms necessary to complete a heterocyclic nucleus selected from the group consisting of five-membered and six-membered heterocyclic nuclei, together with at least one sensitizing dye selected from the group consisting of sensitizing pseudocyanine dyes which do not contain a benzothiazine nucleus and sensitizing 8-alkylcarbocyanine dyes having the following general formula:

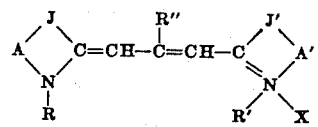

wherein A and A' represent a divalent organic group selected from the group consisting of phenylene and naphthylene groups, J and J' represent a divalent atom selected from the group consisting of oxygen, sulfur and selenium, R, R' and R'' represent alkyl groups and X represents an acid radical.

3. A photographic gelatino-silver-halide emulsion containing a supersensitizing combination of at least one sensitizing thiazinocyanine of the following general formula:

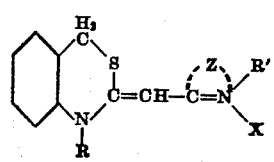

wherein R and R' represent alkyl groups, X represents an acid radical and Z represents the non-metallic atoms necessary to complete a heterocyclic nucleus selected from the group consisting of five-membered and six-membered heterocyclic nuclei, together with at least one sensitizing dye selected from the group consisting of sensitizing pseudocyanine dyes which do not contain a benzothiazine nucleus and sensitizing 8-alkylcarbocyanine dyes having the following general formula:

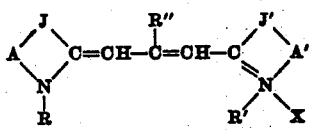

wherein A and A' represent a divalent organic group selected from the group consisting of phenylene and naphthylene groups, J and J' represent a divalent atom selected from the group consisting of oxygen, sulfur and selenium, R, R' and R'' represent alkyl groups and X represents an acid radical.

4. A photographic gelatino-silver-halide emulsion containing a supersensitizing combination of at least one sensitizing thiazinocyanine dye having the following general formula:

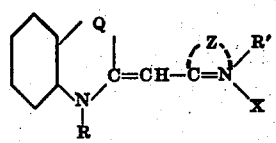

wherein R and R' represent alkyl groups of the formula $C_nH_{2n+1}$ wherein $n$ represents a positive integer of from one to four, X represents an acid radical, Q represents a $-CH_2-S-$ group and Z represents the non-metallic atoms necessary to complete a heterocyclic nucleus selected from the group consisting of five-membered and six-membered heterocyclic nuclei, together with at least one sensitizing dye having the following general formula:

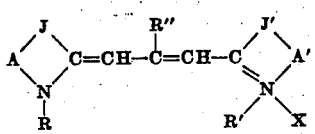

wherein A and A' represent a divalent organic group selected from the group consisting of phenylene and naphthylene groups, J and J' represent a divalent atom selected from the group consisting of oxygen, sulfur and selenium, R and R' represent alkyl groups of the formula $C_nH_{2n+1}$ wherein $n$ represents a positive integer of from one to four, R'' represents an alkyl group of the formula $C_nH_{2n+1}$ wherein $n$ represents a positive integer of from one to two, and X represents an acid radical.

5. A photographic gelatino-silver-halide emulsion containing a supersensitizing combination of at least one sensitizing thiazinocyanine dye having the following general formula:

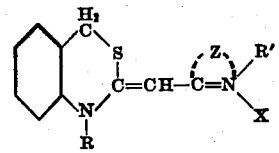

wherein R and R' represent alkyl groups of the formula $C_nH_{2n+1}$ wherein $n$ represents a positive integer of from one to four, X represents a halide radical and Z represents the non-metallic atoms necessary to complete a heterocyclic nucleus selected from the group consisting of five-membered and six-membered heterocyclic nuclei, together with at least one sensitizing dye having the following general formula:

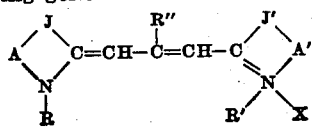

wherein A and A' represent a divalent organic group selected from the group consisting of phenylene and naphthylene groups, J and J' represent a divalent atom selected from the group consisting of oxygen, sulfur and selenium, R and R' represent alkyl groups of the formula $C_nH_{2n+1}$ wherein $n$ represents a positive integer of from one to four, R'' represents an alkyl group of the formula $C_nH_{2n+1}$ wherein $n$ represents a positive integer of from one to two, and X represents a halide radical.

6. A photographic gelatino-silver-halide emulsion containing a supersensitizing combination of at least one 4,4'-dichloro-2,2'-dialkyl-8-ethylthiacarbocyanine dye wherein the 2-alkyl and 2'-alkyl groups are alkyl groups of the formula $C_nH_{2n+1}$ wherein $n$ represents a positive integer of from one to four, together with at least one sensitizing thiazinocyanine dye selected from the group consisting of 2,4'-dialkylthia-2',4'-thiazinocyanine dyes, 4,1'-dialkyl-2,4-thiazino-2'-cyanine dyes, 2,4'-dialkyl-5,6-benzothia-2',4'-thiazinocyanine dyes, 2,4'-dialkylselena--2',4'-thiazinocyanine dyes, 4,3'-dialkyl-2,4-thiazinothiazolinocyanine dyes and 2,4'-dialkyl-3,4-benzoxa-2',4'-thiazinocyanine dyes, the said alkyl groups in each of said thiazino dyes being alkyl groups of the formula $C_nH_{2n+1}$ wherein $n$ represents a positive integer of from one to four.

7. A photographic gelatino-silver-halide emulsion containing a supersensitizing combination of at least one 4,4'-dichloro-2,2'-dialkyl-8-ethylthiacarbocyanine halide wherein the 2-alkyl and 2'-alkyl groups are alkyl groups of the formula $C_nH_{2n+1}$ wherein $n$ represents a positive integer of from one to four, together with at least one sensitizing thiazinocyanine halide selected from the group consisting of 2,4'-dialkylthia-2'-4'-thiazinocyanine halides, 4,1'-dialkyl-2,4-thiazino-2'-cyanine halides, 2,4'-dialkyl-5,6-benzothia-2',4'-thiazinocyanine halides, 2,4'-dialkylselena-2', 4'-thiazinocyanine halides, 4,3'-dialkyl-2,4-thiazinothiazolinocyanine halides and 2,4'-dialkyl-3,4 - benzoxa - 2',4' - thiazinocyanine halides, the said alkyl groups in each of the said thiazino dyes being alkyl groups of the formula $C_nH_{2n+1}$ wherein $n$ represents a positive integer of from one to four.

8. A photographic gelatino-silver-halide emulsion containing a supersensitizing combination of at least one 4,4'-dichloro-2,2',8-triethylthiacarbocyanine halide, together with at least one sensitizing thiazinocyanine dye selected from the group consisting of 2,4'-dialkylthia-2',4'-thiazinocyanine halides, 4,1'-dialkyl-2,4-thiazino-2'-cyanine halides, 2,4'-dialkyl-5,6-benzothia-2',4'-thiazinocyanine halides, 2,4'-dialkylselena-2',4'-thiazinocyanine halides, 4,3'-dialkyl-2,4-thiazinothiazolinocyanine halides and 2,4'-dialkyl-3,4-benzoxa-2',4'-thiazinocyanine halides, the said alkyl groups in each of the said thiazino dyes being alkyl groups of the formula $C_nH_{2n+1}$ wherein $n$ represents a positive integer of from one to four.

9. A photographic gelatino-silver-halide emulsion containing a supersensitizing combination of at least one 4,4'-dichloro-2,2',8-triethylthiacarbocyanine halide, together with at least one sensitizing thiazinocyanine dye selected from the group consisting of 2,4'-diethylthia-2',4'-thiazinocyanine halides, 4,1'-diethyl-2,4-thiazino-2'-cyanine halides, 2,4'-diethyl-5,6-benzothia-2',4'-thiazinocyanine halides, 2,4'-dialkylselena-2',4'-thiazinocyanine halides, 4,3'-diethyl-2,4-thiazinothiazolinocyanine halides, and 2,4'-diethyl-3,4-benzoxa-2',4'-thiazinocyanine halides.

10. A photographic gelatino-silver-halide emulsion containing a supersensitizing combination of at least one 2,2'-dialkyl-8-ethyl-5,6,5',6'-dibenzoxacarbocyanine dye wherein the 2-alkyl and 2'-alkyl groups are alkyl groups of the formula $C_nH_{2n+1}$ wherein $n$ represents a positive integer of from one to four, together with at least one sensitizing thiazinocyanine dye selected from the group consisting of 2,4'-dialkylthia-2',4'-thiazinocyanine halides, 4,1'-dialkyl-2,4-thiazino-2'-cyanine halides, 2,4'-dialkyl-5,6-benzothia-2',4'-thiazinocyanine dyes, 2,4'-dialkylselena-2',4'-thiazinocyanine dyes, 4,3'-dialkyl-2,4-thiazinothiazolinocyanine dyes and 2,4'-dialkyl-3,4-benzoxa-2',4'-thiazinocyanine dyes, the said alkyl groups in each of the said thiazino dyes being alkyl groups of the formula $C_nH_{2n+1}$ wherein $n$ represents a positive integer of from one to four.

11. A photographic gelatino-silver-halide emulsion containing a supersensitizing combination of at least one 2,2'-dialkyl-8-ethyl-5,6,5',6'-dibenzoxacarbocyanine halide wherein the 2-alkyl and 2'-alkyl groups are alkyl groups of the formula $C_nH_{2n+1}$ wherein $n$ represents a positive integer of from one to four, together with at least one sensitizing thiazinocyanine halide selected from the group consisting of 2,4'-dialkylthia-2',4'-thiazinocyanine halides, 4,1'-dialkyl-2,4-thiazino-2'-cyanine halides, 2,4'-dialkyl-5,6-benzothia-2',4'-thiazinocyanine halides, 2,4'-dialkylselena-2',4'-thiazinocyanine halides, 4,3'-dialkyl-2,4-thiazinothiazolinocyanine halides and 2,4'-dialkyl-3,4-benzoxa-2',4'-thiazinocyanine halides, the said alkyl groups in each of the said thiazino dyes being alkyl groups of the formula $C_nH_{2n+1}$ wherein $n$ represents a positive integer of from one to four.

12. A photographic gelatino-silver-halide emulsion containing a supersensitizing combination of at least one 2,2',8-triethyl-5,6,5',6'-dibenzoxacarbocyanine halide, together with at least one sensitizing thiazinocyanine halide selected from the group consisting of 2,4'-dialkylthia-2',4'-thiazinocyanine halides, 4,1'-dialkyl-2,4-thiazino-2'-cyanine halides, 2,4'-dialkyl-5,6-benzothia-2',4'-thiazinocyanine halides, 2,4'-dialkylselena-2',4'-thiazinocyanine halides, 4,3'-dialkyl-2,4-thiazinothiazolinocyanine halides, and 2,4'-dialkyl-3,4-benzoxa-2',4'-thiazinocyanine halides, the said alkyl groups in each of the said thiazino dyes being alkyl groups of the formula $C_nH_{2n+1}$ wherein $n$ represents a positive integer of from one to four.

13. A photographic gelatino-silver-halide emulsion containing a supersensitizing combination of at least one 2,2',8-triethyl-5,6,5',6'-dibenzoxacarbocyanine halide, together with at least one sensitizing thiazinocyanine halide selected from the group consisting of 2,4'-diethylthia-2',4'-thiazinocyanine halides, 4,1'-diethyl-2,4-thiazino-2'-cyanine halides, 2,4'-diethyl-5,6-benzothia-2',4'-thiazinocyanine halides, 2,4'-diethylselena-2',4'-thiazinocyanine halides, 4,3'-diethyl-2,4-thiazinothiazolinocyanine halides and 2,4'-diethyl-3,4-benzoxa-2',4'-thiazinocyanine halides.

14. A photographic gelatino-silver-halide emulsion containing a supersensitizing combination of at least one sensitizing pseudocyanine dye which does not contain a benzothiazine nucleus, together with at least one sensitizing thiazinocyanine dye of the following general formula:

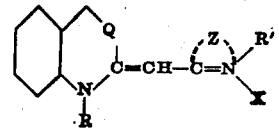

wherein R and R' represent alkyl groups of the formula $C_nH_{2n+1}$ wherein $n$ represents a positive integer of from one to four, Q represents a —$CH_2$—S— group, X represents an acid radical and Z represents the non-metallic atoms necessary to complete a heterocyclic nucleus selected from the group consisting of five-membered and six-membered heterocyclic nuclei.

15. A photographic gelatin-silver-halide emulsion containing a supersensitizing combination of at least one sensitizing pseudocyanine dye which does not contain a benzothiazine nucleus, together with at least one sensitizing dye of the following general formula:

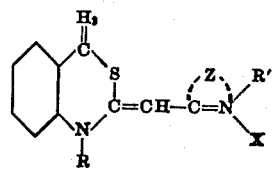

wherein R and R' represent alkyl groups of the formula $C_nH_{2n+1}$ wherein $n$ represents a positive integer of from one to four, X represents an acid radical and Z represents the non-metallic atoms necessary to complete a heterocyclic nucleus selected from the group consisting of five-membered and six-membered heterocyclic nuclei.

16. A photographic gelatino-silver-halide emulsion containing a supersensitizing combination of at least one pseudocyanine dye selected from the group consisting of 1,1'-dialkyl-2,2'-cyanine halides, 1,1'-dialkyl-5,6-benzo-2,2'-cyanine halides, 2,1'-dialkylthia-2'-cyanine halides, 2,1'-dialkyl-3,4-benzothia-2'-cyanine halides, 2,1'-dialkyl-3,4-benzoxa-2'-cyanine halides, 2,1'-dialkylselena-2'-cyanine halides and 3,1'-dialkyloxazolo-2'-cyanine halides, and alkyl groups in each of said pseudocyanine dyes being of the formula $C_nH_{2n+1}$ wherein $n$ represents a positive integer of from one to four, together with at least one sensitizing thiazinocyanine dye selected from the group consisting of 2,4'-dialkylthia-2',4'-thiazinocyanine halides, 4,1'-dialkyl-2,4-thiazino-2'-cyanine halides, 2,4'-dialkyl-5,6-benzothia-2',4'-thiazinocyanine halides, 2,4'-dialkylselena-2',4'-thiazinocyanine halides, 4,3'-dialkyl-2,4-thiazinothiazolinocyanine halides and 2,4'-dialkyl-3,4-benzoxa-2'-thiazinocyanine halides, said alkyl groups in each of said thiazino dyes being of the formula $C_nH_{2n+1}$ wherein $n$ represents a positive integer of from one to four.

17. A photographic gelatino-silver-halide emulsion containing a supersensitizing combination of at least one 2,4'-dialkylthia-2',4'-thiazinocyanine halide, together with at least one pseudocyanine halide selected from the group consisting of 1,1'-dialkyl-2,2'-cyanine halides, 1,1'-dialkyl-5,6-benzo-2,2'-cyanine halides, 2,1'-dialkylthia-2'-cyanine halides, 2,1'-dialkyl-3,4-benzothia-2'-cyanine halides, 2,1'-dialkyl-3,4-benzoxa-2'-cyanine halides, 2,1'-dialkylselena-2'-cyanine halides and 3,1'-dialkyloxazolo-2'-cyanine halides, said alkyl groups in said thiazino dyes and in said pseudocyanine dyes being of the formula $C_nH_{2n+1}$ wherein $n$ represents a positive integer of from one to four.

18. A photographic gelatino - silver - halide emulsion containing a supersensitizing combination of at least one 2,4'-diethylthia-2',4'-thiazinocyanine halide, together with at least one pseudocyanine halide selected from the group consisting of 1,1'-diethyl-2,2'-cyanine halides, 1',1 - diethyl-6-methyl - 2,2' - cyanine halides, 1-methyl-1'-ethyl-2,2'-cyanine halides, 1,1' - diethyl-5,6-benzo-2,2'-cyanine halides, 2-methyl-1'-ethylthia-2'-cyanine halides, 4-chloro-2,1'-diethylthia-2'-cyanine halides, 2,1' - diethyl - 3,4 - benzothia-2'-cyanine halides, 2,1'-diethyl - 6' - methyl-3,4-benzothia-2'-cyanine halides, 2,1'-diethyl-3,4-benzoxa-2'-cyanine halides, 2,1' - diethylselena-2'-cyanine halides and 3,1'-diethyl-4-phenyloxazolo-2'-cyanine halides.

BURT H. CARROLL.